United States Patent
Tafti et al.

(10) Patent No.: US 10,146,224 B2
(45) Date of Patent: Dec. 4, 2018

(54) PROCESSOR-IMPLEMENTED SYSTEMS AND METHODS FOR AUTOMATED DRIVING

(71) Applicant: GM GLOBAL TECHNOLOGY OPERATIONS LLC, Detroit, MI (US)

(72) Inventors: Sayyed Rouhollah Jafari Tafti, Troy, MI (US); Shuqing Zeng, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 149 days.

(21) Appl. No.: 15/347,546

(22) Filed: Nov. 9, 2016

(65) Prior Publication Data

US 2018/0129203 A1    May 10, 2018

(51) Int. Cl.
*G05D 1/00*    (2006.01)
*G05D 1/02*    (2006.01)

(52) U.S. Cl.
CPC ......... *G05D 1/0088* (2013.01); *G05D 1/0212* (2013.01); *G05D 1/0278* (2013.01)

(58) Field of Classification Search
CPC ...... G05D 1/00; G05D 1/0088; G05D 1/0212; G05D 1/0278; G06Q 10/06; G01C 21/34; G01C 21/3407
See application file for complete search history.

(56) References Cited

U.S. PATENT DOCUMENTS

| | | | | |
|---|---|---|---|---|
| 5,648,901 A | * | 7/1997 | Gudat | B60K 31/0008 701/23 |
| 8,712,676 B2 | * | 4/2014 | Hiestermann | G01C 21/32 701/119 |
| 9,165,477 B2 | * | 10/2015 | Wilson | G08G 1/0112 |
| 9,861,024 B2 | * | 1/2018 | Vogler | A01B 69/008 |
| 2005/0192749 A1 | * | 9/2005 | Flann | A01B 69/008 701/301 |
| 2012/0022781 A1 | * | 1/2012 | Wilson | G01C 21/3469 701/410 |
| 2013/0046466 A1 | * | 2/2013 | Yucel | G01C 21/3469 701/538 |
| 2013/0052614 A1 | * | 2/2013 | Mollicone | G09B 19/167 434/65 |
| 2015/0266455 A1 | * | 9/2015 | Wilson | G09B 19/10 701/93 |
| 2015/0331423 A1 | * | 11/2015 | Volger | G01C 21/00 701/25 |
| 2016/0031450 A1 | * | 2/2016 | Wilson | G09B 19/10 701/23 |
| 2016/0362118 A1 | * | 12/2016 | Mollicone | B60W 40/09 |

* cited by examiner

*Primary Examiner* — Yonel Beaulieu
(74) *Attorney, Agent, or Firm* — Lorenz & Kopf, LLP

(57) ABSTRACT

Systems and methods are provided for controlling a vehicle. In one embodiment, a method includes receiving vehicle and object environment data. A search graph is generated based upon the received data. The search graph contains a grid of points for locating objects and is used to determine a desired trajectory for the vehicle.

18 Claims, 15 Drawing Sheets

PROCESSOR-IMPLEMENTED SYSTEMS AND METHODS FOR AUTOMATED DRIVING

TECHNICAL FIELD

The present disclosure generally relates to autonomous vehicles, and more particularly relates to systems and methods for trajectory planning in an autonomous vehicle.

BACKGROUND

An autonomous vehicle is a vehicle that is capable of sensing its environment and navigating with little or no user input. An autonomous vehicle senses its environment using sensing devices such as radar, lidar, image sensors, and the like. The autonomous vehicle system further uses information from global positioning systems (GPS) technology, navigation systems, vehicle-to-vehicle communication, vehicle-to-infrastructure technology, and/or drive-by-wire systems to navigate the vehicle.

Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

Accordingly, it is desirable to provide systems and methods that perform efficient trajectory planning for various automated driver-assistance systems. It is further desirable to provide methods and systems for trajectory planning that addresses various driving environments, such as but not limited to urban and highway driving. Furthermore, other desirable features and characteristics of the systems and methods will become apparent from the subsequent detailed description and the appended claims, taken in conjunction with the accompanying drawings and the foregoing technical field and background.

SUMMARY

Systems and methods are provided for controlling a first vehicle. In one embodiment, a method includes receiving vehicle and object data. A search graph is generated based upon the received data. The search graph contains a grid of points for locating objects and is used to determine a trajectory path for the vehicle.

In another embodiment, a method includes receiving vehicle state data, driving scenario plan, and vehicle object environment data. A search graph is generated based upon the received vehicle state data and driving scenario plan. The search graph contains a grid of points for locating objects relative to a reference trajectory path. The search graph uses a coordinate system that indicates lateral offsets of the objects relative to the reference trajectory path. A trajectory path is determined that is optimal with respect to specific cost function. The optimal trajectory path is provided to a controller in the vehicle for implementing the driving scenario plan.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
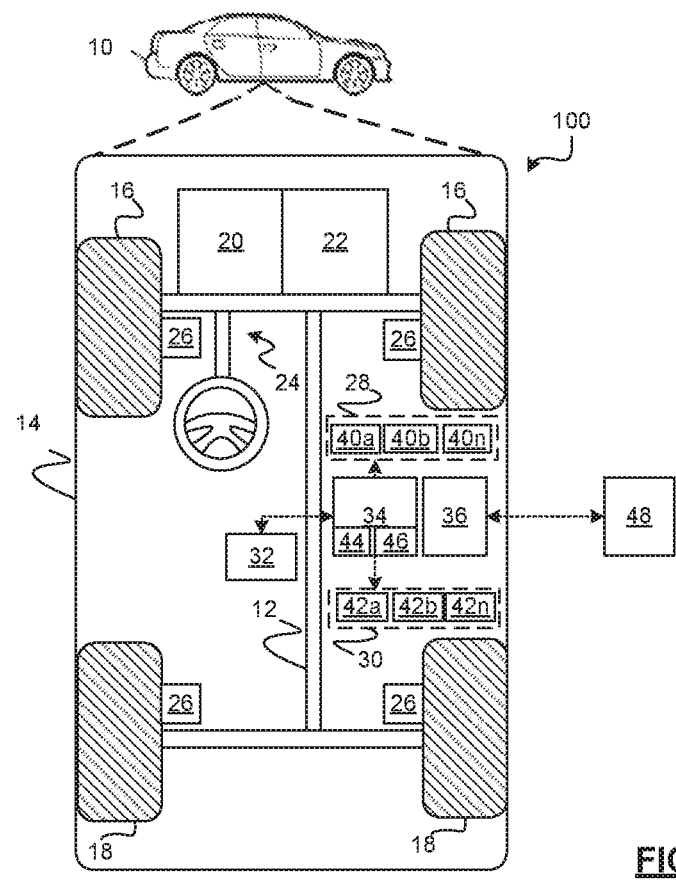
FIG. 1 is a block diagram illustrating an autonomous vehicle having a trajectory planning system, in accordance with various embodiments.

With reference to FIG. 1, a trajectory planning system shown generally at 100 is associated with a vehicle 10 in accordance with various embodiments. In general, system 100 determines a trajectory plan for automated driving.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous vehicle and the trajectory planning system 100 is incorporated into the autonomous vehicle 10 (hereinafter referred to as the autonomous vehicle 10). The autonomous vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, and/or other sensors. The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the controller 34 are embodied in the trajectory planning system 100 and, when executed by the processor 44, generates a trajectory output that addresses kinematic and dynamic constraints of the environment. For example, the instructions receive as input process sensor and map data. The instructions perform a graph-based approach with a customized cost function to handle different road scenarios in both urban and highway roads.

Figure 2:
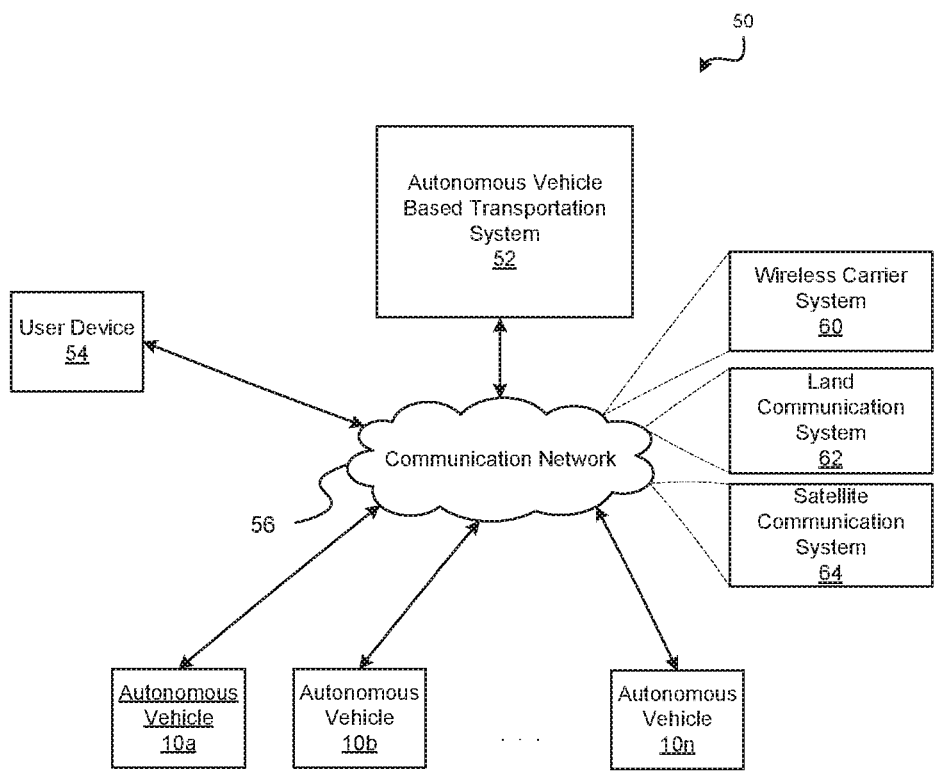
FIG. 2 is a block diagram illustrating a transportation system having one or more autonomous vehicles of FIG. 1, in accordance with various embodiments.

The communication system 36 is configured to wirelessly communicate information to and from other entities 48, such as but not limited to, other vehicles ("V2V" communication,) infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

With reference now to FIG. 2, in various embodiments, the autonomous vehicle 10 described with regard to FIG. 1 may be suitable for use in the context of a taxi or shuttle system in a certain geographical area (e.g., a city, a school or business campus, a shopping center, an amusement park, an event center, or the like) or may simply be managed by a remote system. For example, the autonomous vehicle 10 may be associated with an autonomous vehicle based remote transportation system. FIG. 2 illustrates an exemplary embodiment of an operating environment shown generally at 50 that includes an autonomous vehicle based remote transportation system 52 that is associated with one or more autonomous vehicles 10a-10n as described with regard to FIG. 1. In various embodiments, the operating environment 50 further includes one or more user devices 54 that communicate with the autonomous vehicle 10 and/or the remote transportation system 52 via a communication network 56.

The communication network 56 supports communication as needed between devices, systems, and components supported by the operating environment 50 (e.g., via tangible communication links and/or wireless communication links). For example, the communication network 56 can include a wireless carrier system 60 such as a cellular telephone system that includes a plurality of cell towers (not shown), one or more mobile switching centers (MSCs) (not shown), as well as any other networking components required to connect the wireless carrier system 60 with a land communications system. Each cell tower includes sending and receiving antennas and a base station, with the base stations from different cell towers being connected to the MSC either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 60, a second wireless carrier system in the form of a satellite communication system 64 can be included to provide uni-directional or bi-directional communication with the autonomous vehicles 10a-10n. This can be done using one or more communication satellites (not shown) and an uplink transmitting station (not shown). Uni-directional communication can include, for example, satellite radio services, wherein programming content (news, music, etc.) is received by the transmitting station, packaged for upload, and then sent to the satellite, which broadcasts the programming to subscribers. Bi-directional communication can include, for example, satellite telephony services using the satellite to relay telephone communications between the vehicle 10 and the station. The satellite telephony can be utilized either in addition to or in lieu of the wireless carrier system 60.

A land communication system 62 may further be included that is a conventional land-based telecommunications network connected to one or more landline telephones and connects the wireless carrier system 60 to the remote transportation system 52. For example, the land communication system 62 may include a public switched telephone network (PSTN) such as that used to provide hardwired telephony, packet-switched data communications, and the Internet infrastructure. One or more segments of the land communication system 62 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 52 need not be connected via the land communication system 62, but can include wireless telephony equipment so that it can communicate directly with a wireless network, such as the wireless carrier system 60.

Although only one user device 54 is shown in FIG. 2, embodiments of the operating environment 50 can support any number of user devices 54, including multiple user devices 54 owned, operated, or otherwise used by one person. Each user device 54 supported by the operating environment 50 may be implemented using any suitable hardware platform. In this regard, the user device 54 can be realized in any common form factor including, but not limited to: a desktop computer; a mobile computer (e.g., a tablet computer, a laptop computer, or a netbook computer); a smartphone; a video game device; a digital media player; a piece of home entertainment equipment; a digital camera or video camera; a wearable computing device (e.g., smart watch, smart glasses, smart clothing); or the like. Each user device 54 supported by the operating environment 50 is realized as a computer-implemented or computer-based device having the hardware, software, firmware, and/or processing logic needed to carry out the various techniques and methodologies described herein. For example, the user device 54 includes a microprocessor in the form of a programmable device that includes one or more instructions stored in an internal memory structure and applied to receive binary input to create binary output. In some embodiments, the user device 54 includes a GPS module capable of receiving GPS satellite signals and generating GPS coordinates based on those signals. In other embodiments, the user device 54 includes cellular communications functionality such that the device carries out voice and/or data communications over the communication network 56 using one or more cellular communications protocols, as are discussed herein. In various embodiments, the user device 54 includes a visual display, such as a touch-screen graphical display, or other display.

The remote transportation system 52 includes one or more backend server systems, which may be cloud-based, network-based, or resident at the particular campus or geographical location serviced by the remote transportation system 52. The remote transportation system 52 can be manned by a live advisor, or an automated advisor, or a combination of both. The remote transportation system 52 can communicate with the user devices 54 and the autonomous vehicles 10a-10n to schedule rides, dispatch autonomous vehicles 10a-10n, and the like. In various embodiments, the remote transportation system 52 stores store account information such as subscriber authentication information, vehicle identifiers, profile records, behavioral patterns, and other pertinent subscriber information.

In accordance with a typical use case workflow, a registered user of the remote transportation system 52 can create a ride request via the user device 54. The ride request will typically indicate the passenger's desired pickup location (or current GPS location), the desired destination location (which may identify a predefined vehicle stop and/or a user-specified passenger destination), and a pickup time. The remote transportation system 52 receives the ride request, processes the request, and dispatches a selected one of the autonomous vehicles 10a-10n (when and if one is available) to pick up the passenger at the designated pickup location and at the appropriate time. The transportation system 52 can also generate and send a suitably configured confirmation message or notification to the user device 54, to let the passenger know that a vehicle is on the way.

As can be appreciated, the subject matter disclosed herein provides certain enhanced features and functionality to what may be considered as a standard or baseline autonomous vehicle 10 and/or an autonomous vehicle based remote transportation system 52. To this end, an autonomous vehicle and autonomous vehicle based remote transportation system can be modified, enhanced, or otherwise supplemented to provide the additional features described in more detail below.

Figure 3:
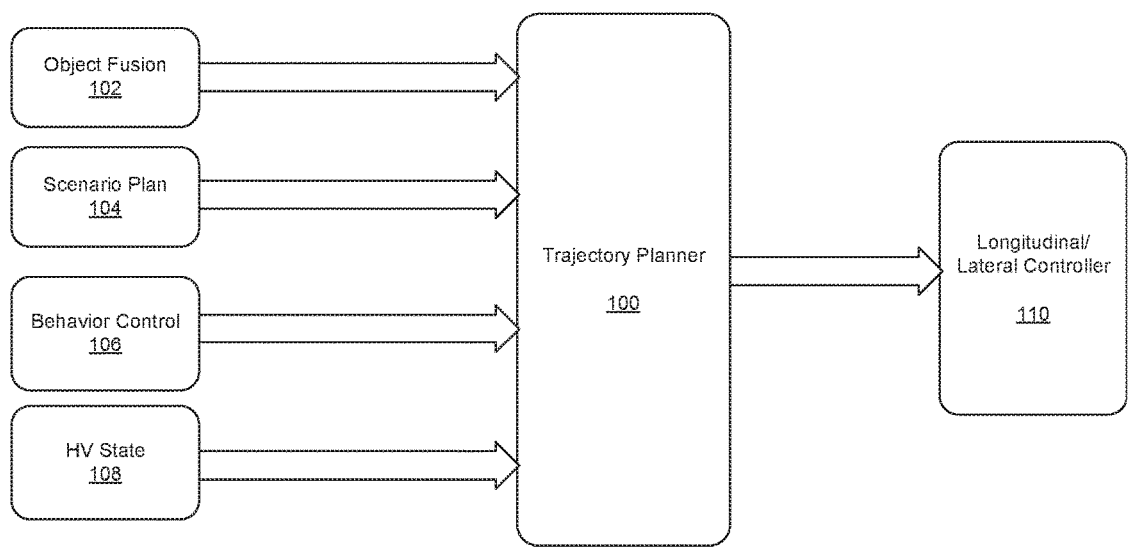
FIGS. 3 and 4 are dataflow diagrams illustrating a trajectory planning system of the autonomous vehicle, in accordance with various embodiments.

With reference to FIG. 3, and with continued reference to FIG. 1, a dataflow diagram illustrates various embodiments of the trajectory planning system 100 which may be embedded within the controller 34. Various embodiments of the trajectory planning system 100 according to the present disclosure can include any number of sub-modules embedded within the controller 34. As can be appreciated, the sub-modules shown in FIG. 3 can be combined and/or further partitioned to similarly perform trajectory planning. Inputs to the trajectory planning system 100 may be received from the sensor system 28, received from other control modules (not shown) associated with the autonomous vehicle 10, received from the communication system 36, and/or determined/modeled by other sub-modules (not shown) within the controller 34.

In various embodiments, the controller 34 includes a trajectory planning system 100 that receives host vehicle data, road geometry, map attributes, and remote objects as inputs and generates a collision-free and feasible trajectory for the vehicle to follow in the near future. More specifically, the trajectory planner 100 receives free-space constraints after object fusion process 102 has occurred. Fusion refers to the process of fusing data from one or more sensors to provide a holistic view of the objects in the environment. The free-space constraints from the object fusion process 102 includes a list of objects within the environment, such as remote road users and obstacles on the road.

Scenario plan process 104 provides as input to the trajectory planning system 100 road boundary constraints using map data and lane fusion along with a reference trajectory assuming obstacle-free environments. Behavior control process 106 provides high-level behavioral instructions considering all traffic participants and scenarios. Additionally, host vehicle (HV) state process 108 provides position and kinematic constraints for the current state of the host vehicle. Use of such input data ensures that the trajectory planner 100 is provided with a comprehensive understanding of the current scenario.

The trajectory planner 100 processes the inputs in order to generate a trajectory output that in one embodiment satisfies the kinematic and dynamic constraints of the host vehicle as well as the free-space and road boundary constraints of the environment. The generated trajectory includes a list of path waypoints along with a velocity profile for use by the longitudinal and lateral controller 110 in autonomous driving.

Figure 4:
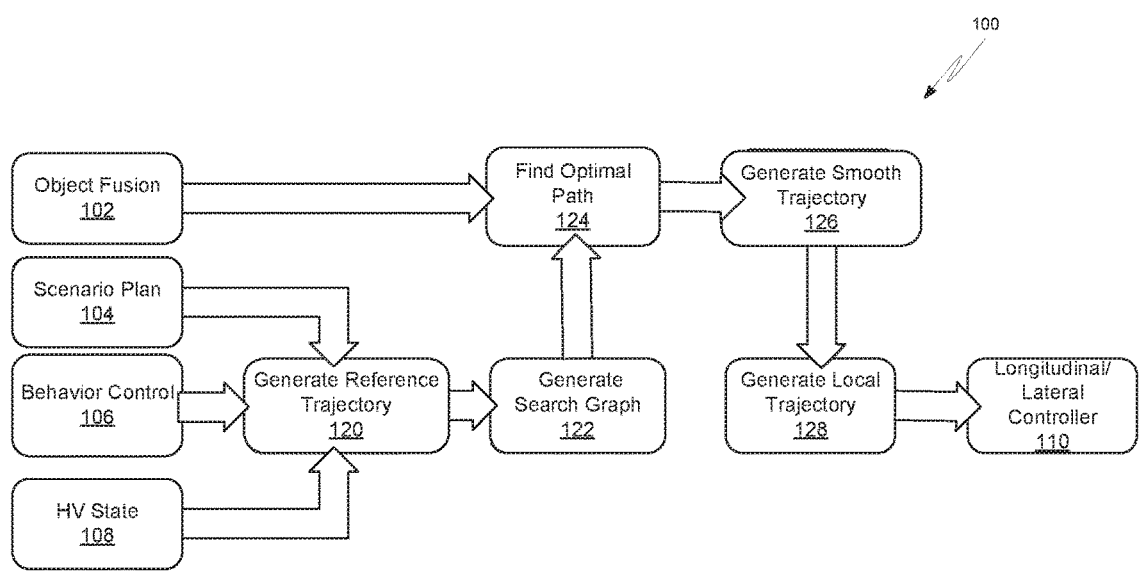

FIG. 4 depicts components within the trajectory planner 100 for an autonomous vehicle, in accordance with various embodiments. The trajectory planner 100 generates a reference trajectory through component 120. Component 120 uses scenario plan data, behavior control data, and host vehicle state data to generate a reference trajectory that assumes no obstacles. The reference directory is generated relative to the host vehicle and allows the trajectory planner 100 to assess where the host vehicle is relative to other obstacles, such as other vehicles.

Component 122 uses the generated reference trajectory for generating a search graph. The search graph contains a grid of points that when connected offer various trajectory paths. The points are offset from the reference trajectory. Objects are associated with certain points on the grid to indicate the degree of lateral offset that an obstacle has with respect to the reference trajectory.

Component 124 takes the free-space constraints from the object fusion process 102 to determine an optimal trajectory path. For performing the optimization, component 124 includes a cost function that accounts for one or more factors related to: collision avoidance with static and dynamic objects on the road; degree of offset from the reference directory; etc.

Component 126 smooths the trajectory path based upon the optimal path determined by component 124. Component 126 designates a safe corridor around the optimal path for avoiding collision with other objects. Curve smoothing operations are performed to reduce extent of curvature and curvature rate while filing the trajectory path. Component 128 further refines the trajectory path by generating a local trajectory that satisfies certain criteria for reaching the desired destination point. Such criteria can include trajectory duration, offset trajectory, etc.

The generated local trajectory is provided to the longitudinal and lateral controller 110 of the vehicle for implementing the trajectory path plan. Because of the inputs and processing depicted in FIG. 4, the trajectory output satisfies the kinematic and dynamic constraints of the host vehicle and free-space and road boundary constraints of the environment.

The generation and refinement of the trajectory paths by the trajectory planner 100 are further described through the visual examples of FIGS. 5-11 and in further reference to FIG. 4.

Figure 5:
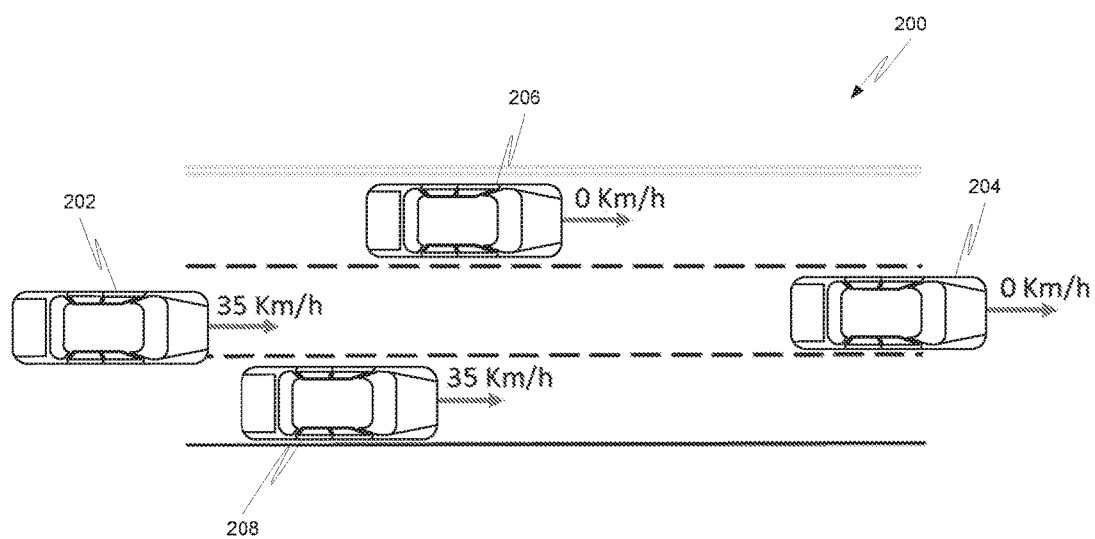
FIG. 5 depicts a topographical view of several vehicles including an autonomous-driving host vehicle.

FIG. 5 depicts a topographical view of several vehicles including a host vehicle (HV) 202 and several target vehicles (TVs) (204, 206, 208). Host vehicle 202 is traveling in the center lane at 35 kilometers per hour. Two target vehicles (204, 206) are stopped as indicated by the annotation "0 km/h" in the figure. The third target vehicle 208 is traveling in this example at the same rate as the host vehicle 202, namely thirty-five kilometers per hour. The obstacle environment is described through the data provided the scenario planning process 104, behavior control process 106, and the host vehicle state process 108 of FIG. 4.

Figure 6:
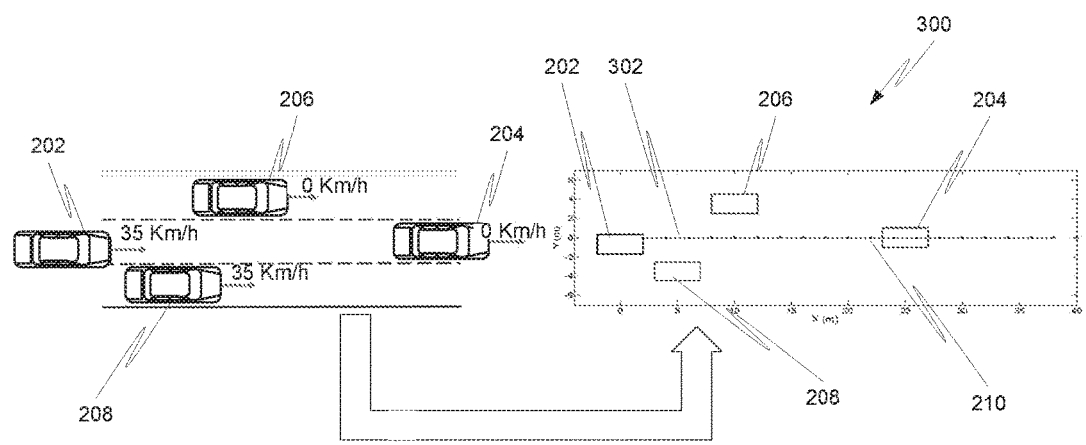
FIG. 6 is a topographical view illustrating the generation of a reference trajectory.

FIG. 6 illustrates at 300 the generation of a reference trajectory 302 by component 120. The reference trajectory 302 includes a reference path (e.g., an initial path to follow) and is generated assuming no obstacles. An X-Y coordinate system is imposed upon the environment to allow the objects in the environment to be numerically positioned along an X-axis and a Y-axis with the host vehicle 202 being positioned at the origin. Both axes in this examples are measured in the units of a distance (e.g., meters).

The trajectory planner 100 uses another coordinate system to further assess the host vehicle 202 with respect to other objects. The station-lateral (S-L) coordinate system defines objects relative to "station" waypoints along the reference trajectory and how far away "laterally" is an object offset from the reference trajectory 302. Designating objects in this manner relative to the host vehicle 202 helps handle more difficult driving scenarios, such as sharp curves on the road, intersections, roundabout, U-turns, etc.

Within the S-L coordinate system, the reference trajectory 302 includes at different station waypoints a velocity profile. The velocity profile indicates velocity of the host vehicle 202 at the different waypoints. For example, the velocity profile of the host vehicle 202 at the tenth centerline waypoint station (shown at reference numeral 210) may show a slower velocity at this point versus another station point earlier along the reference trajectory 302 in order to avoid target vehicle 204. In this example, the velocity profile is determined based on one or more factors such as, the target vehicles' speed on the road, acceleration/deceleration limits, road speed limits, etc.

Figure 7:
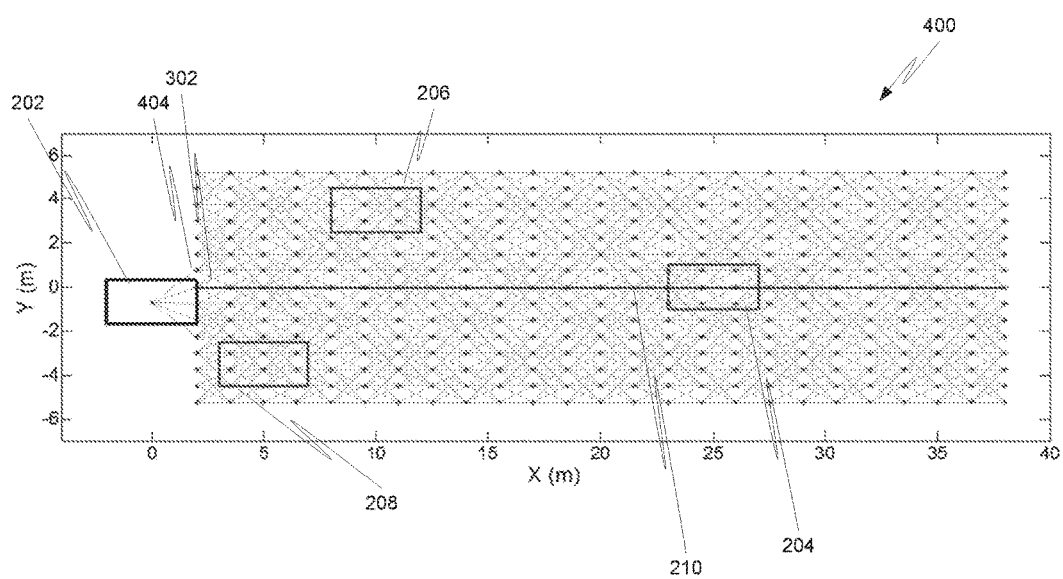
FIG. 7 is a topographical view illustrating the generation of a search graph.

FIG. 7 depicts at 400 the generation of a search graph by component 122. The search graph contains nodes that are offset in the lateral direction from the centerline waypoint stations. Line segments connect a node to its neighboring nodes. For example, node 402 is connected via a line segment to neighboring node 404. In general, each node is assumed to have the same velocity as its corresponding reference trajectory point.

Figure 8:
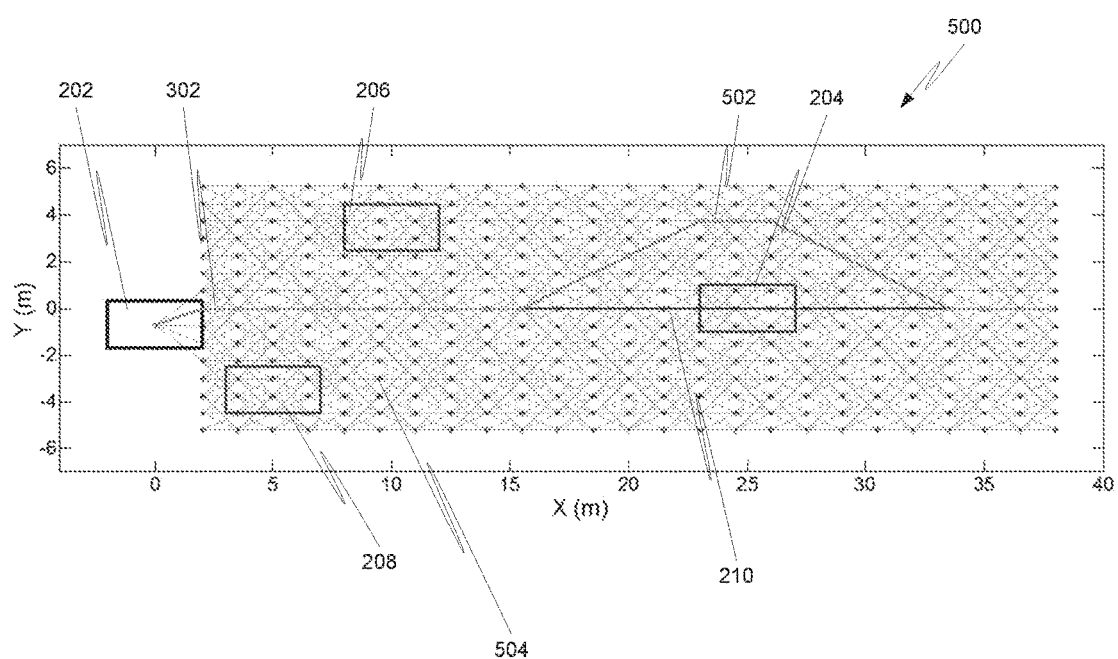
FIG. 8 is a topographical view illustrating the generation of an optimal trajectory path.

FIG. 8 depicts at 500 the generation of an optimal path by component 124. The optimal path is one that best reaches a desired destination given the constraints and environmental factors. The optimization approach uses a cost function to help identify a path 502 through the nodes that is optimal with respect to one or more driving factors. These factors can include: a cost associated with possible collision with static and dynamic objects on the road; degree of offset from reference trajectory; required steering action; degree of deviation from the previously generated trajectory; etc. The following provides an example of a cost function for each path through the search graph:

$$D_i = \sum_j \left( \alpha_L \frac{D_{ij}^o}{D_{max}^o} + \alpha_s \frac{D_{ij}^s}{D_{max}^s} + \alpha_d \frac{D_{ij}^o}{D_{max}^d} + \alpha_p \frac{D_{ij}^p}{D_{max}^p} \right)$$

where:
$D_{ij}^o$: Offset from the reference trajectory
$D_{ij}^s$: steering action cost
$D_{ij}^d$: Offset of the segments from the previous planned trajectory
$D_{ij}^p$: Virtual potential field value to keep the path away from obstacles:
$D_{ij}^p$: value is infinity if shifted targets are within a close region of the host vehicle; otherwise the value is zero.
α values are tuned to meet specific driving and performance requirements such as HV dynamic constraints, driver comfortless, safety, eco-driving
$D_{max}$ values elected to normalize distance costs to [0 1] range As an illustration of the cost function, the path for host vehicle 202 through node 504 has a high cost because the possibility of collision with target vehicle 208 is high. In contrast, path 502 has a much lower cost because of the avoidance of the various objects within the environment.

Figure 9:
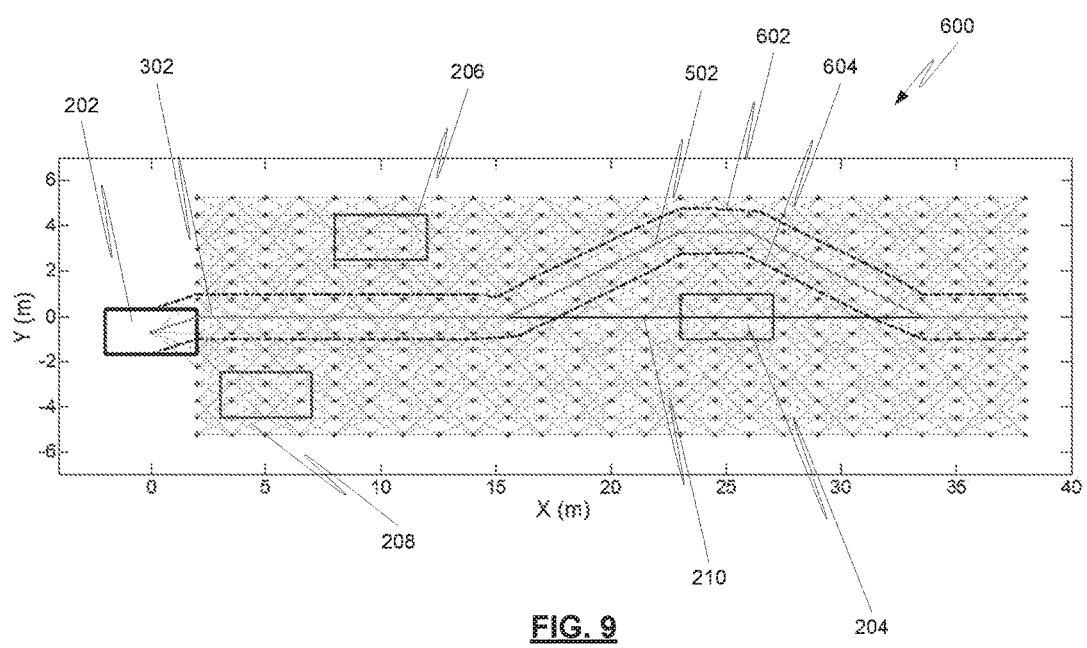
FIG. 9 is a topographical view illustrating the determination of a safe corridor.

FIG. 9 depicts at 600 the determination of a safe corridor as shown by lines 602 and 604 that bound the optimal path 502. The safe corridor defines the range within which subsequently refined pathways can vary in a safe manner. More specifically, lines 602 and 604 are connecting points on both sides of the optimal path 502 which are at safe distances from all surrounding obstacles.

Figure 10:
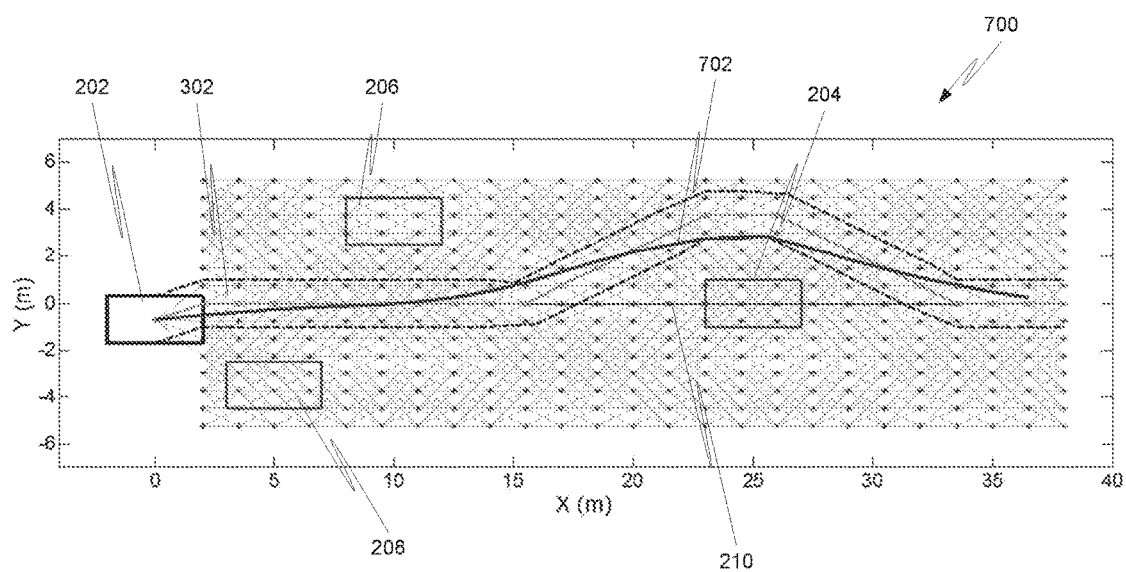
FIG. 10 is a topographical view illustrating the generation of a smooth trajectory.

FIG. 10 depicts at 700 the generation of a smooth trajectory 702 by component 126. The smooth trajectory 702 is a path within the safe corridor with minimal curvature and curvature rate. This avoids, among other things, maximum lateral acceleration/jerk driving experience.

Figure 11:
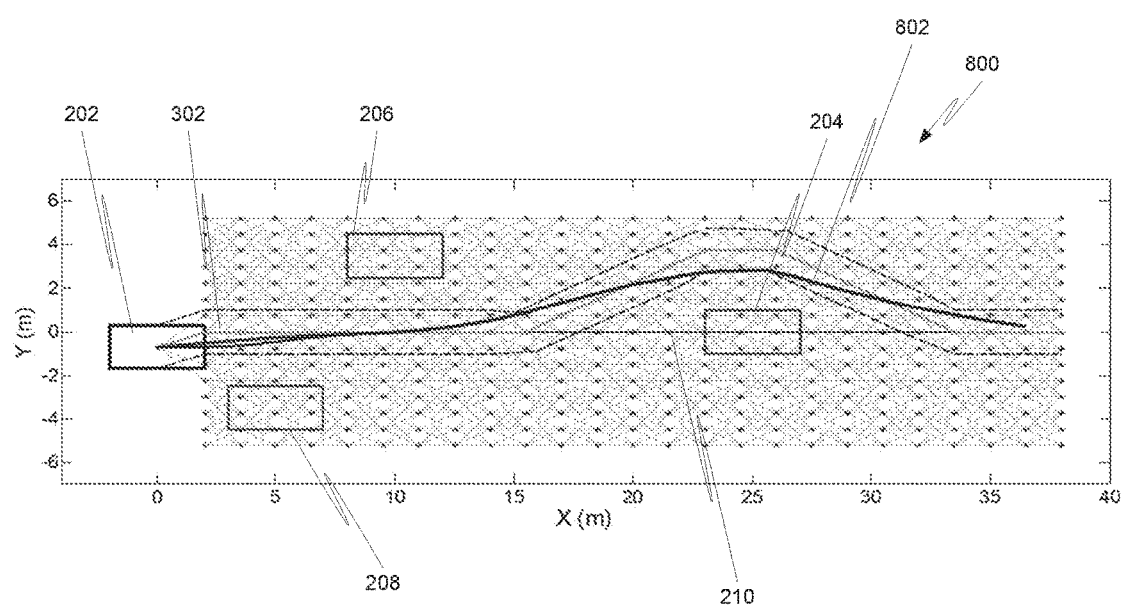
FIG. 11 is a topographical view illustrating the generation of a local trajectory.

FIG. 11 depicts at 800 the generation of a local trajectory 802 by component 128. Multiple trajectories satisfying continuity conditions are planned to reach destination points on the smoothed trajectory at different lookahead times. Local trajectory differs from the smooth trajectory in that it satisfies kinematic constraints, such as continuity in position, heading, curvature and velocity, for the host vehicle. By adding the local trajectory processing, these constraints can be satisfied for the host vehicle.

The local trajectory can be determined based upon one or more of the following cost items: trajectory duration; offset from smooth trajectory; maximum lateral acceleration; and collision possibility. The local trajectory 802 is provided to the longitudinal and lateral controller 110 for use in driving the host vehicle 202.

Figure 12:
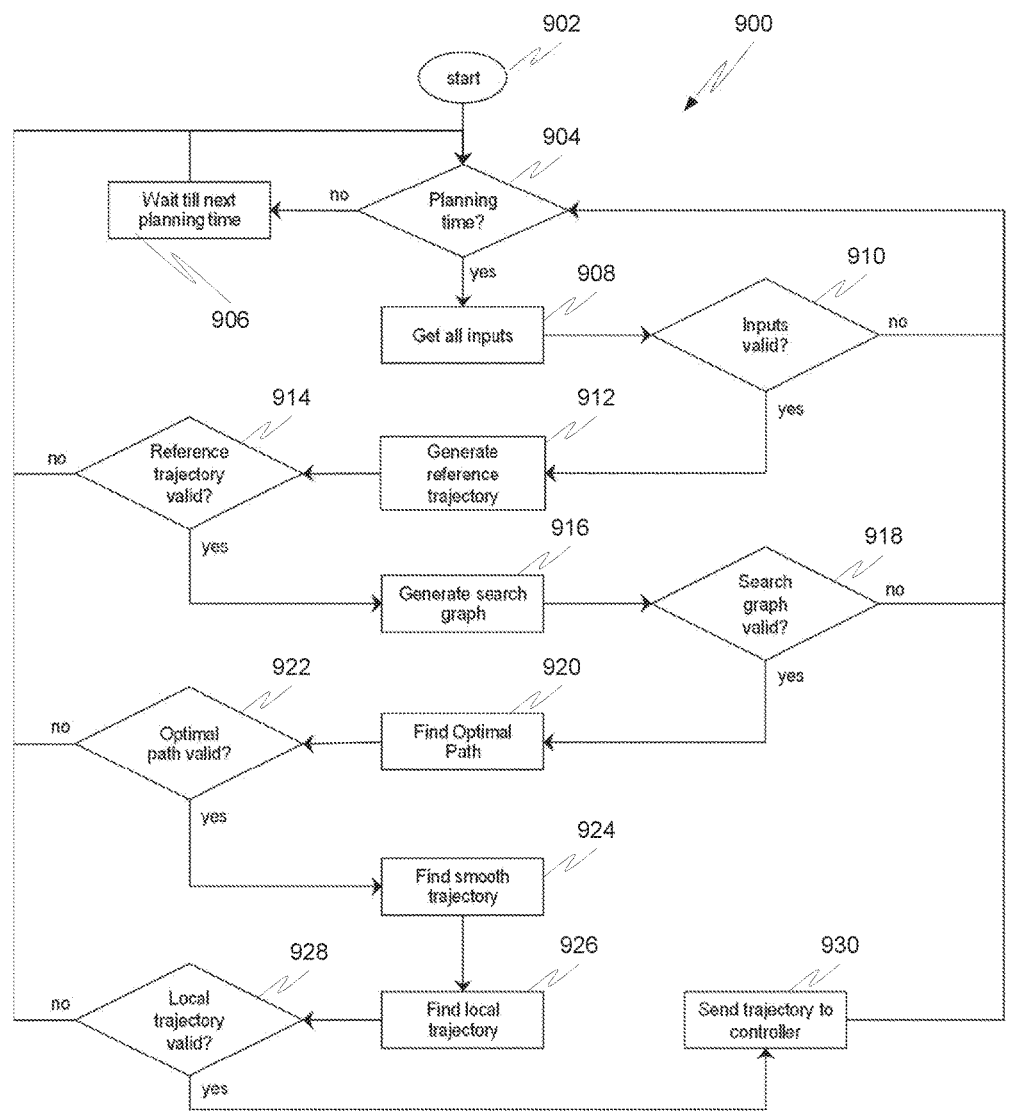
FIG. 12 is a flowchart illustrating an operational scenario for controlling the autonomous host vehicle, in accordance with various embodiments.

FIG. 12 depicts at 900 a flowchart illustrating an operational scenario for trajectory planning. The operational scenario 900, in this example, begins at decision block 904 as indicated by start block 902. Decision block 904 inquires whether sufficient time has elapsed since the last trajectory planning determination. As an illustration, the planning time can be set for every 20-50 milliseconds depending upon the vehicle's environment.

If the planning time point has not been reached, then processing waits until the next planning time point is reached as indicated at process block 906. If the planning time point has been reached, then process block 908 obtains inputs from the various sensors and devices. This includes the object fusion input data as well as other input data items discussed herein. Decision block 910 examines whether the inputs are valid. If they are not valid, processing returns to decision block 904. If the inputs are valid, then processing continues at process block 912.

Process block 912 generates a reference trajectory so that the station-lateral coordinate system can be established. Decision block 914 examines whether the reference trajectory is valid. If it is not valid, then processing continues at decision block 904. If the reference trajectory is valid, then processing continues at process block 916.

Process block 916 generates a search graph. If the search graph is not valid as determined at decision block 918, then processing continues at decision block 904. If the search graph is valid, then the optimal path is determined at process block 920 for establishing nodes along the centerline waypoint stations with different lateral offsets. If the optimal path is not valid as determined at decision block 922, then processing resumes at decision block 904.

If the optimal path is valid, then processing continues at process block 924. Process block 924 generates a smooth trajectory that seeks to minimize the curvature and curvature rate along a path within the safe corridor. At process block 926, the local trajectory is determined based upon the smooth trajectory as well as seeking to satisfy continuity conditions for reaching the destination points at different lookahead times. Continuity positions can include such items as continuity in position, heading, curvature as well as velocity and acceleration of the host vehicle. If the local trajectory is not valid as determined by decision block 928, then processing continues at decision block 904. If the local trajectory is valid, then process block 930 provides the local trajectory to the controller.

As can be appreciated in light of the disclosure, the order of operation within the method is not limited to the sequential execution as illustrated in FIG. 12, but may be performed in one or more varying orders as applicable and in accordance with the present disclosure. In various embodiments, the operational scenario 900 can be scheduled to run based on one or more predetermined events, and/or can run continuously during operation of the autonomous vehicle.

The operational scenario depicted in FIG. 12 includes a trajectory planning method which is computationally efficient through its geometric approach and also generic as it can be used in a wide range of road scenarios including low-speed with sharp curve/turn for urban and high-speed driving for highway roads. Additionally, the planning method of the operational scenario is reactive to changes in the host vehicle's dynamics as well as in other dynamic objects on the roads. The resulting trajectory in this operational scenario follows the rules of traffic, is safe within the road boundaries, and considers host vehicle non-holonomic motion constraints as well as dynamic constraints such as maximum lateral acceleration/jerk.

The operational scenario in FIG. 12 can be configured with a vast number of variations. For example, process block 924 can be configured to generate a smooth trajectory within the safe corridor with minimal curvature and curvature rate based upon the following steps:

Step 1: Find corresponding corridor points, $L_i$ and $u_i$ for each graph layer.

Step 2: Define the path points within the safe corridor and along each graph layer as:

$$P_{iX}=L_{ix}+\lambda_i(u_{ix}-L_{ix}), P_{iY}=L_{iy}+\lambda_i(u_{iy}-L_{iy}), \lambda_i \in [0,1]$$

Step 3: For each path point $P_i$, define the cost function:

$$F_i = w_1 C_i^2 + w_2 (\Delta C_i)^2$$

where $C_i$ and $\Delta C_i$ are the estimated curvature and curvature rate:

$$C_i = \frac{2\sin(\angle P_{i-1}P_i P_{i+1})}{|P_{i-1}-P_{i+1}|} + \kappa_i, \Delta C_i = \frac{C_i - C_{i-1}}{|P_i - P_{i-1}|}$$

where $\kappa_i$ is the road's curvature in Cartesian coordinate frame

Step 4: Find $\lambda_i$:

$$\overline{\lambda}_i = \min_{\lambda_i}(F_i)$$

Step 5: Update path point as:

$$P_{iy} = \begin{cases} L_{iy} + \overline{\lambda}_i(u_{iy} - L_{iy}) & \text{if } \overline{\lambda}_i \in [0, 1] \\ L_{iy} & \text{if } \overline{\lambda}_i < 0 \\ u_{iy} & \text{if } \overline{\lambda}_i > 1 \end{cases}$$

Step 6: Repeat Steps 2-5 until curvature and curvature rate along the path are less than threshold values.

Figure 13:
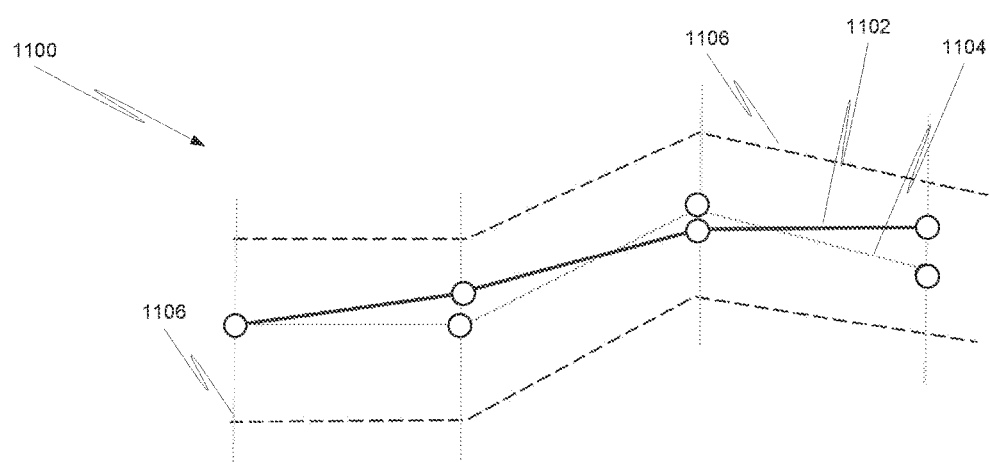
FIG. 13 is a topographical view illustrating the generation of a smooth trajectory in one embodiment.

FIG. 13 provides a visualization at 1100 of a trajectory path 1102 that has been smoothed according to steps 1-6. In FIG. 13, the smoothed trajectory path 1102 represents a smoother path than the earlier generated path 1104 in terms of curvature and curvature rate. The smoothed trajectory path 1102 further lies within the safe corridor as defined by lines 1106.

As another example of the wide variations, process block 926 can include the following steps for determining a local trajectory relative to the smoothed trajectory path 1102:

First step: several trajectory candidates are found using the following polynomials for path and velocity profiles:

$$y=p_0+p_1 x+p_2 x^2+p_3 x^3+p_4 x^4+p_5 x^5$$

$$v=q_0+q_1 t+q_2 t^2+q_3 t^3$$

And satisfy the following boundary conditions:

$$(x_i,y_i,\theta_i,k_i)=(0,0,0,k_0)$$

$$(x_f,y_f,\theta_f,k_f)=(x_e^i,y_e^i,\theta_e^i,k_e^i)$$

$$(v_i,a_i)=(v_0,a_0)$$

$$(v_f,a_f)=(v_e^i,a_e^i)$$

Figure 14:
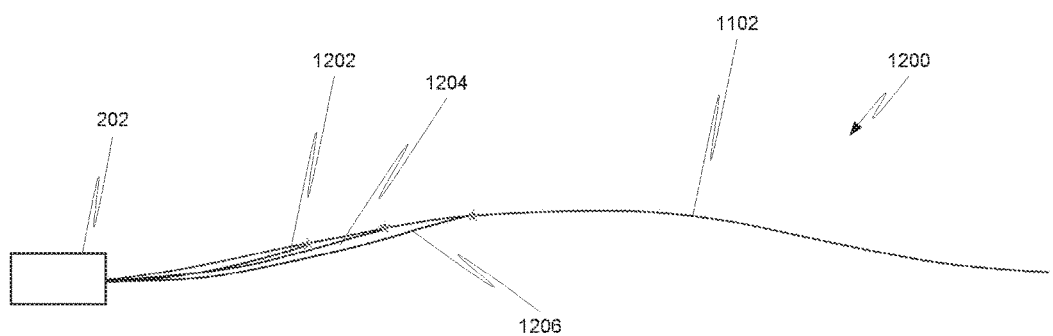
FIG. 14 is a topographical view illustrating the generation of a local trajectory in one embodiment.

FIG. 14 provides a visualization at 1200 of several trajectory candidates (1202, 1204, and 1206) that were determined based upon the first step.

Second step: optimal trajectory is determined in terms of the following cost function: trajectory duration; offset from smooth trajectory; maximum lateral acceleration; and collision possibility.

Figure 15:
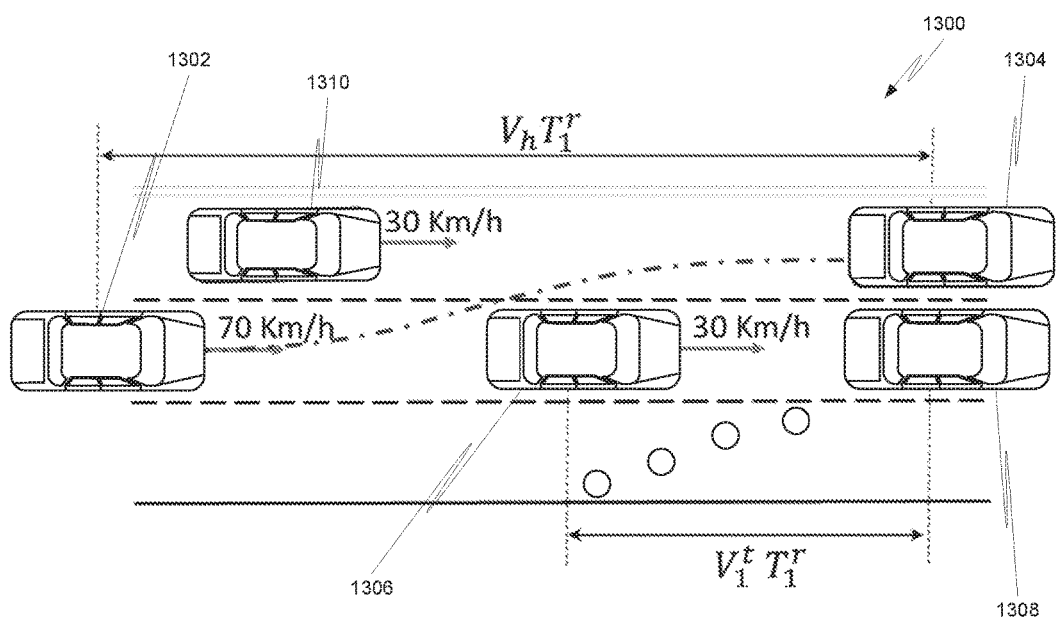
FIG. 15 is a topographical view illustrating a threat assessment in one embodiment.

As another example of the wide variations, the processing contained in the operational scenario of FIG. 12 can be configured to ensure a collision-free path by considering the dynamics of other vehicles on the road. FIG. 15 provides at 1300 a visualization of this assessment of the dynamics of other vehicles on the road.

In this example of FIG. 15, host vehicle 1302 is traveling at 70 km per hour and wishes to pass a target vehicle 1306 which is traveling at 30 km per hour. The collision checking process examines the shift over time that the vehicles 1302 and 1306 are undergoing. For example, host vehicle 1302 will arrive at destination position 1304 at the time vehicle 1306 arrives at position 1308. Assessment of other dynamic objects (e.g., moving vehicle target 1310 traveling at 30 km per hour) is also included. The assessment of such changes in vehicle position over time can be done for collision checking by performing one or more of the following operations:

For process block 920 in FIG. 12, the optimal path generation can assess: for each search graph segment, virtual potential field is calculated based on moving the dynamic targets with respect to the time it takes the host vehicle to reach that segment. The safe corridor calculation can assess: for each shortest path segment, dynamic targets are shifted with respect to the time it takes the host vehicle to reach that segment.

For process block 926 in FIG. 12, the local trajectory generation can assess: for each local trajectory candidate, collision checking is done based on shifting the dynamic targets with respect to host vehicle time to reach there.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A processor-implemented method for automated driving of a vehicle, comprising:
    receiving, by one or more data processors, vehicle state data, driving scenario plan, behavior control data and vehicle object environment data;
    generating, by the one or more data processors, a search graph based upon the received vehicle state data and driving scenario plan;
    wherein the search graph contains a grid of points for locating objects relative to a reference trajectory path;
    wherein the search graph uses a coordinate system that indicates lateral offsets of the objects relative to the reference trajectory path stations; and
    determining, by the one or more data processors, a trajectory path that is optimal with respect to a specific cost function;
    wherein the optimal trajectory path is provided to a controller in the vehicle for implementing the driving scenario plan.

2. The method of claim 1, wherein the objects include other vehicles on the road.

3. The method of claim 1, wherein the determining of the trajectory path includes using a cost function during optimization of the trajectory path, wherein the cost function contains factors reactive to changes in dynamics of the vehicle and the objects on the road.

4. The method of claim 3, where the cost function includes offset from the reference trajectory path, steering action cost, offsets from a previously planned trajectory path, and a collision cost factor for the vehicle with respect to one or more of the objects.

5. The method of claim 1, wherein search graphs are generated using the coordinate system to determine trajectory paths in different road scenarios.

6. The method of claim 5, wherein the road scenarios include sharp turns, U-turns, sharp turns in urban settings, and high-speed driving for highway roads.

7. The method of claim 1 further comprising:
    smoothing the optimal trajectory path based upon minimizing curvature and curvature rates within a safe corridor associated with the search graph;
    wherein the safe corridor defines a distance range from the optimal path within which the vehicle is at a safe distance from the objects.

8. The method of claim 7 further comprising:
    generating a local trajectory based upon the smoothed trajectory path;
    wherein the local trajectory is determined based upon satisfying continuity conditions for reaching the destination points on the optimal trajectory at different lookahead times.

9. The method of claim 8, wherein the local trajectory satisfies kinematic and dynamic constraints of the vehicle and free-space and road boundary constraints of the environment and is directly used by a longitudinal and lateral controller in the vehicle.

10. The method of claim 8, wherein the local trajectory follows the rules of traffic, is safe within the road boundaries, and considers vehicle non-holonomic motion constraints and dynamic constraints.

11. The method of claim 1, wherein the received vehicle state data, driving scenario plan, and vehicle object environment data are provided by one of the following modules: an object fusion module for listing detected remote road users and obstacles on the road; a scenario plan module which includes road boundaries using map data and lane fusion along with a reference trajectory assuming obstacle-free environments; a behavior control module for handling behavioral instructions with consideration of traffic participants and scenarios; and a vehicle state module for determining current state of the vehicle.

12. The method of claim 1, wherein the search graph includes nodes which represent points along the reference trajectory path stations with different lateral offsets.

13. The method of claim 1, wherein the search graph includes line segments connecting the nodes to neighboring nodes.

14. The method of claim 13, wherein each node has the same velocity as its corresponding reference trajectory point.

15. The method of claim 13, wherein the nodes are associated with velocity profiles relative to the reference trajectory path.

16. The method of claim 15, wherein the velocity profiles are determined based on the objects' speed on the road, acceleration and deceleration limits, and road speed limit.

17. A processor-implemented system for automated driving of a vehicle, comprising:
    a data communication pathway for transmitting vehicle state data, driving scenario plan, and vehicle object environment data;
    one or more data processors configured to:
        generate a search graph based upon the received vehicle state data and driving scenario plan;
    wherein the search graph contains a grid of points for locating objects relative to a reference trajectory path;
    wherein the search graph uses a coordinate system that indicates lateral offsets of the objects relative to the reference trajectory path stations; and
        determine a trajectory path that is optimal with respect to a specific cost function;
    wherein the optimal trajectory path is provided to a controller in the vehicle for implementing the driving scenario plan.

18. An autonomous vehicle, comprising:
    at least one sensor that provides sensor data about objects within the vehicle's environment and about vehicle state; and a controller that, by a processor and based on the sensor data, is configured to:
generate a search graph based upon the vehicle state data and a driving scenario plan;
wherein the search graph contains a grid of points for locating objects relative to a reference trajectory path;
wherein the search graph uses a coordinate system that indicates lateral offsets of the objects relative to the reference trajectory path; and
determine a trajectory path that is optimal with respect to a specific cost function;
wherein the optimal trajectory path is provided to a controller in the vehicle for implementing the driving scenario plan.

* * * * *